INVENTORS.
EDWIN RALPH KOLODNY,
ROBERT BEN BOOTH
BY

ATTORNEY.

United States Patent Office 3,480,761
Patented Nov. 25, 1969

3,480,761
CLEAR OVERFLOW SETTLING WITH VERY HIGH MOLECULAR WEIGHT POLYELECTROLYTES
Edwin Ralph Kolodny and Robert Ben Booth, Stamford, Conn., assignors to American Cyanamid Company, Stamford, Conn., a corporation of Maine
Continuation-in-part of application Ser. No. 756,677, Aug. 22, 1958. This application Mar. 18, 1963, Ser. No. 274,367
Int. Cl. C02b 1/20
U.S. Cl. 210—54     10 Claims This invention relates to a method of settling solids suspended in water at an accelerated rate giving a supernatant liquid which is particularly clear, and more specifically relates to settling suspensions of mineral fines using a water-soluble acrylamide polymer having an intrinsic viscosity of greater than 12 which results in a particularly clear overflow or supernatant liquid.

This application is a continuation-in-part of application Ser. No. 756,677, filed Aug. 22, 1958, now abandoned. A corresponding Canadian application issued as Canadian Patent No. 616,967 on Mar. 21, 1961.

Synthetic water-soluble polyelectrolytes have been used for the settling of mineral fines and other suspensions. British Patent 725,460, "Improvements Relating to the Process of Facilitating the Dewatering of Aqueous Suspensions of Finely-Divided Minerals," dated Apr. 7, 1953, American Cyanamid Company, and British Patent 760,279, "Improvements Relating to the Treatment of Acidic Ore Pulps and Acidic Suspensions of Minerals," American Cyanamid Company, dated July 23, 1954, describe in some detail settling procedures using broad groups of water-soluble polyelectrolytes including polyacrylamides. Pye and Patterson Canadian Patent 522,851, Mar. 20, 1956, "Method of Separating Solids from Aqueous Suspensions" describes the use of a certain acrylamide polymer with from 0.8% to 10% of the amide groups replaced by carboxyl groups and having a solution viscosity of at least 4 centipoises in a 0.5% by weight aqueous solution at a pH of 3 to 3.5 at 21.5° C. Pye Canadian Patent 522,850, Mar. 20, 1956, "Separation of Minerals" describes the use of conventional polymers of acrylamide in concentrating and separating solids from liquid suspensions thereof and stresses the importance of minimal agitation after the addition of the polymer.

We have now found that an acrylamide polymer having an intrinsic viscosity of at least 12 and preferably 18 or more and a hydrolysis of ½% or less, and which is water soluble, gives an overflow or supernatant liquid which is markedly clearer and freer from suspended solids, than that obtained with conventional polymers and additionally gives a faster settling rate and/or requires the use of less polymer.

Figure 1:
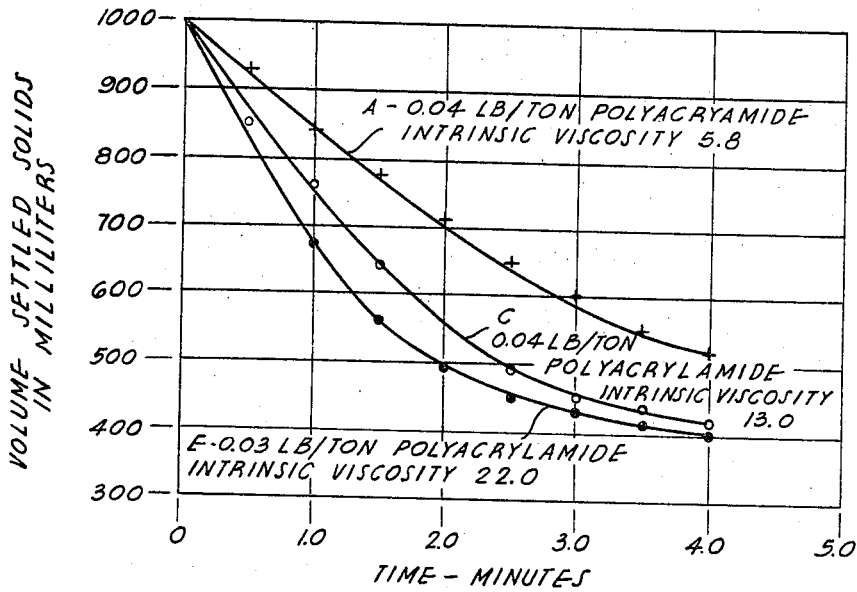
FIGURE 1 shows the volume of settled solids after varying periods of time for the present polyacrylamide and a typical prior art polyacrylamide.

The polyacrylamides employed are defined hereinafter by their intrinsic viscosities, which are regularly employed by polymer chemists as a measurement of molecular weight. As used in the present specification and claims the term "intrinsic viscosity" is a value, expressed in deciliters per gram of polymer, which is proportional to the effective hydrodynamic volume or size of the polymer in solution at zero concentration; i.e., at infinite dilution. See J. Polymer Science, vol. 5, pages 745–7 (1950). This value must be distinguished from ordinary viscosity as measured in centipoises, since the latter term expresses the relationship of the resistance to flow of the liquid being measured to that of water at 68.6° F.

The intrinsic viscosity is determined from the rate of flow of dilute solutions in solvents such as 0.1 normal aqueous sodium chloride or normal aqueous sodium nitrate at 30° C. and at several concentrations. The ratio of the viscosity of the solution of the polymer at any one concentration to the viscosity of the solvent, as measured at 30° C., is the relative viscosity ($N_r$) at this concentration. This value minus one is equal to the specific viscosity ($N_{sp}$). This intrinsic viscosity is determined by plotting the ratio of the specific viscosity ($N_{sp}$) to the concentration of polymer against the concentration of the polymer and extrapolating the resultant plot to zero concentration. Ordinary viscosities are, of course, measured directly in standard instruments such as the Brookfield viscosimeter in which a spindle is rotated at a definite speed in the polymer solution and the resistance to motion is measured in centipoises.

Where the kinematic, or ordinary, viscosity is non-Newtonian, and a function of shear rate, the curves are also extrapolated to zero shear rate.

Molecular weight studies based on light scattering and other indicia have shown that the weight average molecular weight of a polyacrylamide is expressed accurately by the formula Intrinsic viscosity in deciliters per gram $$= 3.73 \ M^{0.66} \times 10^{-4}$$

wherein M is the weight average molecular weight.

The polyacrylamides used in practicing the invention and having intrinsic viscosities of at least 12 and preferably 18 or greater are prepared by polymerizing aqueous monomeric acrylamide solutions in the presence of particular classes of redox catalyst systems. These are mixtures of water-soluble tertiary amines with oxidizing agents such as the water-soluble persulfates, for example an alkali metal or ammonium persulfate, or with peroxides such as hydrogen peroxide and the like and, as a second class, mixtures of water-soluble bromates such as an alkali metal bromate with water-soluble sulfite reducing agents such as sodium sulfite or sodium bisulfite. When these catalyst systems are used it is possible to obtain polyacrylamides of any desired molecular weight within the ranges discussed above by controlling the polymerization temperature and the molar ratios of the two ingredients of the redox catalyst system. U.S. Patent 3,002,960, E. R. Kolodny, "Polyacrylamide Preparation," Oct. 3, 1961, discloses such polymers, and claims a method of preparation.

When the tertiary amine-chemical oxidant redox system is used, polyacrylamides having intrinsic viscosities of 18 and higher are obtained by employing a substantial molar excess of tertiary amine over the persulfate or peroxide, and in most cases quantities of from 2 to about 6 mols of tertiary amine for each mol of persulfate or peroxide should be used. Polyacrylamides having intrinsic viscosities within the range of from 12 to 18 are also obtainable with molar ratios of the catalyst ingredients within this range when polymerization temperatures in excess of about 30° C. are used, particularly when the weight ratio of the catalyst system to the acrylamide monomer in solution is increased. When the second type of redox system is used the preferred new polyacrylamides having intrinsic viscosities of at least 18 are produced by operating at temperatures below 20° C. and preferably below 10° C. with a system containing from about 0.1 to 0.8 mol of the sulfite for each mol of the bromate. The intrinsic viscosity of the polymer decreases as the molar ratio of the sulfite to the bromate approaches 1:1, and also as the weight ratio of bromate to acrylamide monomer is increased. By controlling these ratios it is easy to produce a polyacrylamide having an intrinsic viscosity of 12 or greater. Further details including the results obtained with particular catalyst ratios and polymerization temperatures are described in the following specific examples.

It has been known for many years that polyacrylamides containing carboxylic acid groups, such as polyacrylamides partially hydrolyzed with sodium hydroxide, will form much more viscous solutions when dissolved in pure water than solutions of the corresponding unhydrolyzed polyacrylamides from which they are prepared. This is due to their transformation into polyelectrolytes wherein all the carboxylate groups, formed by the hydrolysis, carry like ionic charges. However, most of this viscosity increase is lost in water containing dissolved inorganic salts, which change the dielectric of the medium so that the mutual repulsion of the charged groups is nullified. The high molecular weight polyacrylamides used in the present invention undergo a corresponding increase in their viscosity-imparting power when they are partially hydrolyzed, and they may be used in this condition. In most cases, however, the viscosity increase obtained by partial hydrolysis is more apparent than real, since dissolved salts in practical systems give an effective viscosity not greatly different from that which would have been obtained if the unhydrolyzed polyacrylamide had been used. Some hydrolysis of the polyacrylamides may occur spontaneously during settling, particularly at higher water temperatures, and it should be noted that they are still effective to accomplish the objects of the invention even in the presence of relatively high concentrations of dissolved salts.

Polyacrylamides in which some of the amide groups have been hydrolyzed to carboxyl groups may be prepared by hydrolyzing polyacrylamide as, for example, in an alkali solution particularly at elevated temperatures. Polyacrylamides may be formed initially in which some of the linkages have carboxyl groups by the polymerization of acrylamide containing some acrylic acid or by adding acrylic acid to acrylamide. Normally acrylamide as sold in commerce contains a percentage of acrylic acid. This may be as small as 0.03% or it may be larger.

Inasmuch as all polyacrylamides conventionally contain at least some proportion of amide groups hydrolyzed to carboxyl groups the term "polyacrylamide" will be used in accordance with conventional practice to denote such a polymer providing that more than 50% of the substitutents on a backbone chain are of the amide type. Preferred results are obtained with less than ½% carboxyl groups.

Actual polymerization can be accomplished with other than acrylamide and acrylic acid and minor proportions of other building blocks may at times be used in the polymerization. There is no advantage in such extraneous building blocks in the chain and for that reason the use of acrylamide as free from materials other than acrylic acid as is compatible with manufacturing efficiency is preferred.

A polyacrylamide of this invention may be used for settling a wide variety of materials. It may be used as the sole flocculating agent or in conjunction with conventional flocculating agents to clarify water for domestic or industrial purposes, and in the flocculation, settling, thickening and dewatering processes used on flotation concentrates and tailings, liquors from leaching minerals and ore materials with water or solutions of acids, alkalies, cyanides, etc., chemical precipitates including fine insoluble calcium, magnesium, and uranium salts, various industrial waste products including those from electroplating, paper processing, deinking, tanning, and food processing, also mine wastes, and effluents from washeries and plants treating sand and gravel, cement materials, iron ores, coal, and phosphate rock, also textile wastes, domestic and industrial sewage, foundry wastes, also suspensions employed in processing various industrial minerals such as clays, fillers, coating materials, asbestos, metallic oxides, pigments, and the like.

A polyacrylamide of this invention improves the filtration rate when the above-listed and like suspensions are dewatered by filtration methods. In addition, the handling of filter cakes and dewatered products is facilitated in that these products are firm and can be removed readily from filtration equipment.

As indicated above, the polyacrylamides may be used alone or employed in conjunction with conventional settling agents such as alums, aluminum sulfate, calcium chloride, lime, iron salts, glues, gelatines, starches, cellulose derivatives, and the like. The polyacrylamide is particularly useful for settling and filtration of mineral suspensions and ore pulps which contain finely-divided predominantly non-argillaceous materials.

The present polymers are useful over a wide pH range giving good results over the entire pH range conventionally used in mining operations and additionally gives good flocculation, settling or filtration with or without added electrolytes. Usually in commercial mining operations soluble material is present in the ore, although additional electrolyte may be added.

The polyacrylamide used in the present invention must be water-soluble. A solubility of at least 0.01% and preferably 0.1% is desired. It is unusual to find a polymer whose molecular weight is in the millons to be water soluble. Because of the high viscosity, even if soluble to a greater degree, dilute solutions are used in handling the polymer.

The polyacrylamides are usually added to suspensions as soltuions in water in concentrations of 0.05 to 5%. It is common practice to make up stock solutions of 0.25 to 1% in strength by feeding the polymer by vibrating or aspirator-type feeders into water under good agitation and then dilute such solutions to 0.1% or lower for feeding as flocculating agents. To achieve the highest efficiency with any polymer thorough distribution of the polymer in the suspension should be effected and such may be obtained by stage feeding and by the use of as dilute solutions as practically possible without causing over dilution of the suspensions undergoing treatment.

The polyacrylamides may be used in aqueous solutions at any temperature at which the water exists in the liquid phase, that is, from 32° F. to boiling. In the following descriptions and examples the temperature will be understood to be room temperature of about 70 to 80° F. unless otherwise specified.

Uranium leaching operations are conveniently carried out of room temperature but more rapid leaching is usually obtained but heating raises costs for fuel so as to compromise the circuits are usually maintained at around 120 to 125° F. The settling is usually somewhat more rapid at slightly elevated temperatures because the viscosity of water is lower at these temperaturse.

The present polymers permit a more rapid settling and particularly yield a clearer supernatant phase or overflow phase than prior polyacrylamides.

The polyacrylamides are highly effective as fluidizing agents for ore suspensions of varying particle size range, and maintain the ore pulp as an integrated mass so as to prevent separation of the coarser fractions from the fines and slime portions. This prevents clogging of agitators in leaching operations, during stoppages and power outs and aids in the pumping and movement of ore pulp by maintaining them in a highly mobile state.

For treating ore pulps and mineral suspensions at a solids content of at least 5% high intrinsic viscosity polyacrylamides give preferred results at a usage of from 0.001 to not more than about 1 pound per ton of solids. For turbid water, or dilute wastes where the solids content is below 5% down to a few parts per million, a higher usage of high intrinsic viscosity polyacrylamide, up to at least 10 pounds per ton of suspended solids, is indicated.

A convenient method of testing the efficacy of settling of polymers is to use a set of graduated 1000 ml. cylinders which are of a sufficiently uniform bore that the variation of the distance between the 1000 milliliter mark and the 600 milliliter mark does not exceed 5 millimeters for the set. Samples are agitated with a stainless steel plunger having a disc diameter of about two inches, a thickness of 1/32 inch and about eighteen 3/16 inch holes spaced over the disc. A 1/8 inch diameter 24 inch handle is welded to the center of the disc.

A uniform material is needed for settling tests. Pulverized silica of minus 120 mesh gives good comparative results. A sufficiently large amount of silica should be blended to form a homogeneous batch for test purposes, and the same batch used for a series of comparisons.

The flocculating agents are dissolved in water at a 0.1% concentration.

One hundred and fifty grams of silica plus or minus 1/2 gram has added thereto about 300 milliliters of water, preferably distilled, and is allowed to soak overnight. The silica is slurried in the water with a spatula, poured into a cylinder, thereto is added 10 milliliters of 0.10 normal sulfuric acid, and the slurry diluted to the 800 milliliter mark on the graduate. The mixture is allowed to soak for one hour and has a pH of around 3.4 to 3.6. A test quantity of a flocculating agent is diluted to 300 milliliters in distilled water, the slurry of silica is stirred with the plunger, and the solution of flocculating agent poured into the graduate bringing the volume to 1100 milliliters. Six plunges, that is, six strokes down and six strokes up, over a period of six seconds without aeration or air entrainment gives uniform dispersion. The suspension is then allowed to settle and the time between when the top of the settling pulp layer passes the 1000 milliliter mark and when it passes the 600 milliliter mark is taken as a settling time. While admitted arbitrary, the ratio of settling times obtained, preferably in parallel runs, by the same operator, gives a performance index or settling index which is indicative of the settling efficiency of particular polymers over a wide range of conditions.

Such a test is conveniently used for laboratory testing. In large plant operations it is convenient to take 1000 milliliter samples from operating tanks in the same cylinders, agitate in the same fashion, and measure the volume of settled solids at various times.

The term "flocculation" in conjunction with the settling of solids is usually used to denote flocculation, aggregation and settling as from a practical standpoint the problem is separating a solid and a liquid phase rather than a theoretical approach to the particular phenomenon taking place.

The same polymers which give superior results in flocculation normally give superior results in filtration.

The following examples describe methods for the preparation of representative polyacrylamides of the invention and show their use in settling. It will be understood, however, that these examples are given primarily for illustrative purposes and that the invention in its broader aspects is as defined in the appended claims.

The polymers used in the present invention have unique properties. They are essentially non-Newtonian. A value of kinematic viscosity (conventional viscosity) is very dependent on shear rate. One particular sample (S3258–18) gave the following, at 0.5% concentration, at 60° C. in three Cannon-Fenske capillary viscometers:

| Viscometer No. | Efflux time, seconds | Viscosity, centistokes |
| --- | --- | --- |
| 300 | 47.7 | 13.76 |
| 200 | 146.9 | 16.58 |
| 150 | 644.9 | 21.15 |

Even in supposedly duplicate capillary viscometers, manufacturing variations cause ambiguous results. On a sample S3258–20, under similar conditions, the results were:

| Viscometer: | Efflux time, seconds | Viscosity, centistokes |
| --- | --- | --- |
| A | 125.2 | 36.16 |
| B | 185.4 | 41.57 |

Viscometer A and B were supplied by the manufacturer as the same size, but different calibrations. On polymer S3228–20, at 0.25% concentration, at 60° C., a capillary kinematic viscosity was obtained of 6.88. With a Brookfield viscosimeter, using a U.L. adapter values were measured at—

R.p.m.:
 6 _____ 19.7
 12 _____ 17.9
 30 _____ 14.4

The shear rate has less effect on viscosity measurements at low concentrations, and conversely.

The viscosity changes with time. Agitation, if vigorous, affects the viscosity.

Hence, unless the shear rate is known, a kinematic viscosity measurement has little significance.

EXAMPLE 1

Pure water (distilled or deionized) is freed from oxygen by boiling for 10 minutes or longer and cooling under an atmosphere of nitrogen and used to prepare an acrylamide solution containing 100 parts by weight of acrylamide for each 900 parts by weight of water. This solution is charged into a reactor containing a submerged inlet for the injection of nitrogen and surrounded by a cooling bath effective to maintain the reaction temperature at 20°±1° C. Ammonium persulfate and 3,3',3''-nitrilo-trispropionamide are added in amounts of 0.04% and 0.16%, respectively, on the weight of the acrylamide and mixed by a vigorous injection of nitrogen whereupon active polymerization begins within a few minutes. The polymerization is continued under a nitrogen blanket for about 8 hours when it is usually about 98% complete. The final product is a tough rubbery gel which may conveniently be put into solution by mixing with water in a sigma blade mixer or converted to a powder by methanol precipitation.

The molecular weights of the polyacrylamides described in the present examples were determined by first measuring the viscosities at 30° C. in a capillary viscometer of the Ubbelohde or suspended level types, which is made by the Cannon Instrument Company at State College, Pa. Viscosities of the novel high molecular weight polyacrylamides were measured in the No. 50 instrument in which the rate of shear varies between 600 and 1500 reciprocal seconds at the solids concentrations used. Measurements were made at 30° C. in 0.1 N aqueous sodium chloride solutions at several different polymer solid concentrations within the range of about 0.1% to 0.01% and were plotted and extrapolated to infinite dilution, which gives the intrinsic viscosity of the polymer. Molecular weights were calculated by substituting this value in the formula described above.

The intrinsic viscosities of the novel polyacrylamides prepared by the above-described procedure are within the range of about 18 to 30 and therefore their molecular weights range from about 12 to about 26 million and higher.

Polyacrylamides within this molecular weight range and having comparable flocculating characteristics in dilute aqueous solutions are also obtained when corresponding quantities of other water-soluble tertiary amines are substituted, in whole or in part, for the nitrilotrispropionamide described above. Typical amines of this class that may be used are dimethylaminopropionitrile, dimethylaminoacetonitrile, beta-methylisopropylaminopropionitrile, beta-methyl-n-butylaminopropionitrile, methyl-beta-cyanoethylaminoacetonitrile, dimethylaminopropanediol and tertiary alkylolamines such as triethanolamine. These and other tertiary amines are preferably used in quantities of about 2 to 6 mols for each mol of persulfate. When all other conditions are the same the molecular weight of the polyacrylamide increases with an increasing molar ratio of amine to persulfate to a maximum at about 4:1, and therefore this is the preferred ratio. The molecular weight also increases with decreasing amounts of catalyst and therefore the concentration of persulfate should be as low as is consistent with good conversion yields when polyacrylamides having intrinsic viscosities of 18 and higher are desired. The recommended minimum is about 0.04% of the weight of the acrylamide monomer used and a suitable range of catalytic amounts is from this value up to about 0.1%. The reaction mixture should be free from acids, which impair the activating power of the amine in the redox catalyst system, and therefore carbon dioxide-containing gases should not be used as the oxygen-exclusive atmosphere.

Polyacrylamides having a sufficiently high molecular weight to obtain the advantages of the invention are obtained with this catalyst system when polymerization temperatures within the range of from about 10° C. to about 35° C. are used. Within this range a low polymerization temperature is the most significant factor favoring high molecular weight. The influence of the factors discussed on the viscosity-imparting properties of the polymers is shown by the representative preparations in the following table. In all cases the amine was nitrilotrispropionamide (NP) and 0.04% of ammonium persulfate (AP) was used.

TABLE I

| Polymer No. | Monomer, Conc. percent | Temp., °C. | Mol ratio AP:NP | Brookfield Viscosity (cps.)[1] (0.25% soln. at 60° C.) |
|---|---|---|---|---|
| 1 | 10 | 20 | 1:3 | 19.3 |
| 2 | 10 | 20 | 1:4 | 23.2 |
| 3 | 10 | 20 | 1:5 | 21.2 |
| 4 | 10 | 20 | 1:6 | 16.35 |
| 5 | 10 | 30 | 1:3 | 12.5 |
| 6 | 5 | 30 | 1:4 | 12.6 |

[1] At 6 r.p.m., U.L. adapter.

Viscosities within the range of 10–15 centipoises at 60° C. are obtainable with 0.25% solutions of the polymers prepared at 30° C. Those prepared at lower temperatures can be used at considerably lower concentrations. The Brookfield viscosity in centiposies at 0.25% solution at 60° C. is not the same as the intrinsic viscosity, but is much easier to measure.

EXAMPLE 2

The results obtainable with other tertiary amine catalysts are illustrated in Table II wherein TEA means triethanolamine, DAN means dimethylaminoacetonitrile, arnd DPD means dimethylaminopropanediol. The monomer concentration was 10% and 0.04% of ammonium persulfate (AP) was used. Viscosities were measured with a Brookfield viscosimeter at 6 r.p.m. in water solution at 60° C. and all except Polymer No. 11 were at 0.25% concentration.

TABLE II

| Polymer No. | Temp., °C. | Amine used | Mol ratio amine:AP | Conv., percent | Viscosity |
|---|---|---|---|---|---|
| 7 | 20 | TEA | 1:4 | 99.1 | 22.8 |
| 8 | 20–25 | DAN | 1:1 | 99.1 | 22.6 |
| 9 | 20 | DPD | 1:2 | 97.7 | 17.4 |
| 10 | 20 | DPD | 1:4 | 98.7 | 25.5 |
| 11 | 15 | TEA | 1:4 | 99.1 | (1) |

[1] Table III.

Dilute water solutions of the novel polyacrylamides of the invention are not affected by dissolved inorganic salts, and therefore they can be used in the presence of salts, and over a wide pH range. The viscosity measurements of 0.5% water solutions of Polymer No. 11 in the presence of salt are:

TABLE III

| NaCl, p.p.m.: | Brookfield viscosity at 30° C. (cps.) |
|---|---|
| None | 183 |
| 500 | 181 |
| 1000 | 181 |
| 1500 | 182 |

EXAMPLE 3

A bromate-sulfite catalyst has several advantages over the amine-persulfate system of the preceding examples. It is not acid-sensitive and therefore a carbon dioxide-containing gas can be used as an oxygen-excluding blanket. Moreover it is possible to prepare high molecular weight copolymers of acrylamide with up to about 15 mol percent of acrylic acid using this catalyst system. Copolymers of acrylamide with up to about 15 mol percent of other olefin carboxylic acids copolymerizable therewith such as methacrylic acid, itaconic acid and the like can also be prepared with this catalyst system.

Polyacryamides having intrinsic viscosities of at least 12 deciliters per gram are produced with this catalyst system at temperatures below about 20° C.; the preferred polymers having intrinsic viscosities of about 18 to 26 are obtainable at 10° C. and lower. When all other conditions are the same the molecular weight of the polyacrylamide increases with an increasing molar ratio of bromate to sulfite and also with decreasing weight ratios of bromate to acrylic monomer within the range of catalytic amounts, which are from about 0.02% to about 0.1%. The novel polyacrylamides of the invention having intrinsic viscosities within the range of about 18–26 are obtained with bromate-sulfite mixtures containing from about 0.1 to about 0.5 mol of the sulfite for each mol of the bromate while the polyacrylamides with intrinsic viscosities in the range of 12–17 are produced with higher proportions of sulfite up to about 0.8 mol per mol of bromate or with higher bromate-acrylamide ratios or both. When the molar proportion of sulfite to bromate is 1:1 or slightly less, there is a sharp drop in the viscosity-imparting properties of the polyacrylamide.

The influence of these factors is shown by the preparations listed in Table IV. In all cases the procedure of Example 1 was repeated using an aqueous 10% acrylamide solution and a sodium bromate-sodium sulfite catalyst. In the headings of the table B means sodium bromate, S means sodium sulfite, Conv. means conversion to polyacrylamide, the Brookfield viscosities were measured at 60° C. in 0.25% water solution at 6 r.p.m. and are expressed in centipoises, and the percentage of sodium bromate is based on the weight of the acrylamide.

TABLE IV

| Polymer No. | Temp., °C. | Mol ratio B:S | Percent B | Percent Conv. | Brookfield viscosity |
|---|---|---|---|---|---|
| 12 | 0–7 | 1:1 | 0.03 | | 5.2 |
| 13 | 0–6 | 1:0.8 | 0.03 | 99.2 | 8.2 |
| 14 | 0 | 1:0.3 | 0.03 | 99 | 17.6 |
| 15 | 1–10 | 1:0.2 | 0.03 | 99 | 19.1 |
| 16 | 0–8 | 1:0.5 | 0.02 | 99 | 12.9 |
| 17 | 0–5 | 1:0.3 | 0.02 | 97.6 | 27.8 |
| Polymer No. 17 1,500 p.p.m. of NaCl | | | | | 27.6 |

The intrinsic viscosities of Polymers Nos. 13 and 17 were measured in the Ubbelohde instrument described in Example 1 and were found to be 12 and 18 respectively. They were measured again in another instrument having a different rate of shear and from the two sets of values the instrinsic viscosities at zero shear were calculated as 14.4 for Polymer No. 13 and 22 for Polymer No. 17. The viscosities of Polymer No. 17 at varying concentrations in water at 60° C. were as follows.

| Conc., percent: | Viscosity, cps. |
|---|---|
| 0.10 | 4.5 |
| 0.15 | 9.0 |
| 0.175 | 12.0 |
| 0.20 | 15.0 |
| 0.25 | 27.6 |

A polyacrylamide, designated as Polymer A in Table V, having an intrinsic viscosity of 18 was prepared by the procedure described in Example 1. The viscosity of an 0.1% solution of this polymer in pure water, as measured in the Brookfield viscosimeter at 60° C. and 6 r.p.m., was 3.4 centipoises. A portion was heated with aqueous sodium hydroxide until it was 5% hydrolyzed and the viscosities of 0.1% solution in pure water and in salt water containing 1500 p.p.m. of NaCl were measured in the same viscosimeter at 60° C. The viscosity of an 0.1% solution of the slightly (about 1%) hydrolyzed polyacrylamide described in United States Patent 2,827,964, which has a weight average molecular weight of about three million and is designated as Polymer B was also measured in pure water for purposes of comparison. The results were as follows:

TABLE V

| | Polymer A in Water | | Polymer B in Water |
|---|---|---|---|
| Conc., percent | Brookfield Vis. (cps.) at 60° C. and 6 r.p.m. | Conc., percent | Brookfield Vis. (cps.) at 60° C. and 6 r.p.m. |
| 0.075 | 2.7 | | |
| 0.10 | 3.4 | 0.10 | 1.6 |
| 0.15 | 6.3 | | |
| 0.25 | 19.7 | 0.25 | 3.5 |
| 0.30 | 31.2 | | |
| 0.50 | 310 | 0.50 | 7.2 |

| | Polymer A, 5% hydrolyzed | | Polymer B in salt water |
|---|---|---|---|
| 0.1% soln. in water | 47.8 | 0.25 | 3.4 |
| 0.1% soln. in salt water | 4.4 | 0.50 | 6.0 |

Partial hydrolysis increases the viscosity of an 0.1% solution of a polyacrylamide of the present invention by a factor of 14 but most of this increase is lost in salt water. It is seen, however, that the viscosity of the polymer before hydrolysis and also after hydrolysis and in salt water is much higher than that of a conventional partially hydrolyzed polyacrylamide in pure water and in salt water.

EXAMPLE 5

A Canadian uranium ore was ground, leached with sulfuric acid and washed by countercurrent decantation. The feed to the washing system was about 25% solids and its pH was 1.8–2.0. To separate 1000 milliliter samples of this feed contained in graduated cylinders polyacrylamides of intrinsic viscosities in the range of 5.8–22.0 were added as flocculating agents. The quantity of polyacrylamide added varied from 0.03 to 0.08 lb./ton of ore solids. The suspensions were allowed to settle and the volumes of settled solids noted at 0.5 minute intervals as follows:

| | Volume (ml.) of settled solids | | | | |
|---|---|---|---|---|---|
| Time, minutes | A | B | C | D | E |
| 0 | 1,000 | 1,000 | 1,000 | 1,000 | 1,000 |
| 0.5 | 930 | 880 | 880 | 850 | 840 |
| 1.0 | 840 | 750 | 760 | 710 | 670 |
| 1.5 | 775 | 620 | 640 | 590 | 560 |
| 2.0 | 705 | 550 | 550 | 515 | 490 |
| 2.5 | 645 | 500 | 490 | 470 | 450 |
| 3.0 | 595 | 465 | 455 | 440 | 430 |
| 3.5 | 550 | 440 | 435 | 420 | 410 |
| 4.0 | 515 | 420 | 415 | 400 | 395 |
| Suspended solids (p.p.m.) in supernatant liquid | 206 | 72 | 51 | 43 | 33 |

Flocculants added

Polyacrylamide, lb./ton:            Intrinsic visc.
  (A) 0.04 _____ 5.8
  (B) 0.08 _____ 5.8
  (C) 0.04 _____ 13.0
  (D) 0.03 _____ 18.0
  (E) 0.03 _____ 22.0

A summary of the above results are presented in FIGURE 1, which is a plot of the volume of settled solids as a function of time, of Samples A, C and E. The superiority of the polyacrylamides with high intrinsic viscosity is readily apparent. The polyacrylamide of Runs A and B is a conventional flocculant in commercial use. The high intrinsic viscosity polymer of Runs C, D and E is superior in that smaller amounts gave better settling rates and a better clarity in the supernatant liquids above the settled solids.

EXAMPLE 6

A Canadian uranium ore was ground and classified hydraulically prior to acid leaching. It was necessary to thicken the classified overflow to avoid excessive dilution of acid during leaching and two polyacrylamides of intrinsic viscosities 5.8 and 13.0 in combination with glue were compared as flocculating-thickening aids. The pH of the classifier overflow was 6.7. In such testing over a period of about one week the average requirements of polyacrylamide and glue for thickening the ore pulp to about 68% solids and the average depth of supernatant liquid and suspended solids contents of the clarified thickener overflow were as follows:

| | Polyacrylamide | | | Thickener Overflow | |
|---|---|---|---|---|---|
| Lot | Intrinsic viscosity | Lb./ton used average | Glue, lb./ton used average | Depth of supernatant liquid (inches) | Suspended solids (p.p.m.) |
| A | 5.8 | 0.0212 | 0.034 | 20 | 238 |
| B | 13.0 | 0.0118 | 0.024 | 33 | 140 |

Polyacrylamide A was a conventional product in commercial use. The advantages of Type B, the high intrinsic viscosity polymer, namely, decreased consumption of polymer, increased depth of clarified thickener overflow above the settled solids, and the higher degree of clarity, are shown by the above data. Lower quantities of glue also were used when polyacrylamide B was employed.

EXAMPLE 7

Separate suspensions of 150 grams of minus 200 mesh silica in 1-liter graduated cylinders diluted to 1100 milliliters total volume was flocculated by addition of 0.25, 0.50, 0.75, and 1.0 mg. of polyacrylamide of intrinsic viscosity of 5.8 deciliter per gram. A second and third series of settling tests in similar silica suspensions were conducted with polyacrylamides of intrinsic viscosities of 13.0 and 22.0 deciliters per gram respectively. After the addition of the polyacrylamides the time of free settling of the silica between the 1000 milliliter and 600 milliliter graduation marks was taken and the settling rate in terms of centimeters per second determined. These rates were as follows:

| Intrinsic viscosity, deciliters/gram | 5.8 | 13.0 | 22.0 |
|---|---|---|---|
| Settling rate (cm./sec.), 0.25 milligram | 0.11 | 0.13 | 0.13 |
| Settling rate (cm./sec.), 0.5 milligram | 0.13 | 0.19 | 0.23 |
| Settling rate (cm./sec.), 0.75 milligram | 0.16 | 0.23 | 0.27 |
| Settling rate (cm./sec.), 1.0 milligram | 0.17 | 0.27 | 0.29 |

Figure 2:
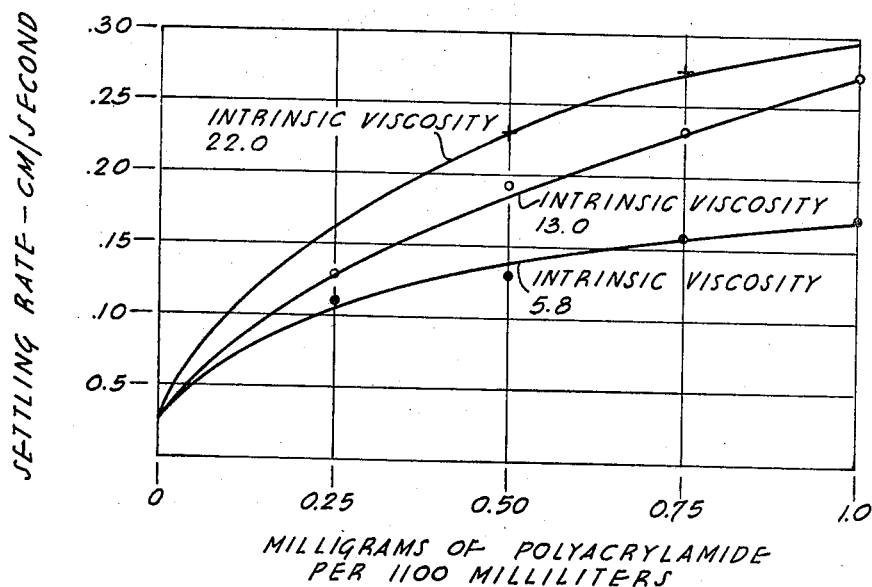
FIGURE 2 shows the settling rate for various concentrations of the present polyacrylamide and a typical prior art polyacrylamide.

These results are presented in FIGURE 2, which is a plot of settling rate as a function of quantity of polyacrylamide used. FIGURE 2 clearly shows the superiority of polyacrylamides of high intrinsic viscosity as flocculating agents.

EXAMPLE 8

A Canadian uranium ore was ground to minus 65 mesh and about 55% minus 200 mesh in particle size. Suspensions of 1000 milliliters of this ground ore containing 600 grams of solids were vacuum filtered on an 8-inch Buchner funnel equipped with a filter flask and vacuum gauge. Under a gauge reading of 25.3 inches mercury vacuum it was found that water could be filtered off at the rate of 240 ml./minute.

An identical sample of this suspension was treated with 0.03 pounds per ton of solids of polyacrylamide of intrinsic viscosity of 22.0 deciliters per gram. The polyacrylamide was added as a 0.1% solution and mixed into the pulp manually by up-and-down agitation with a perforated disc stirrer. From this pulp water was removed under the above described test conditions at a rate of 690 ml./minute, approximately a threefold increase over that observed in the first test without polyacrylamide.

the flocculated solids observed for the companion samples treated with polyacrylamide.

| Suspension treated, type | (Percent) Solids content | Polyacrylamide (Dl./g.) Intrinsic viscosity | Polyacrylamide (Lb./ton) Quantity used | Settling time, seconds |
|---|---|---|---|---|
| Barite | 15 | 12.0 | 0.01 | 44 |
| Limestone | 15 | [1] 14.4 | 0.01 | 42 |
| Feldspar | 15 | 14.4 | 0.01 | 80 |
| Hematite | 15 | 13.0 | 0.02 | 53 |
| Gypsum | 15 | [2] 16.4 | 0.02 | 51 |
| Coal Plant Effluent | 5.1 | [3] 13.0 | 0.06 | 83 |
| Copper Flotation Concentrate | 20 | 22.0 | 0.03 | 74 |
| Copper Flotation Tailing | 15.6 | 22.0 | 0.03 | 61 |
| Cyanidation Tailing | 20.4 | 18.0 | 0.01 | 53 |
| Phosphate Rock Slimes | 4.1 | 16.4 | 0.15 | 114 |
| Alkaline Leached Uranium Ore | 22 | 22.0 | 0.1 | 79 |
| Uranium Precipitate | 1.5 | 13.0 | 0.04 | 43 |
| Domestic Sewage [4] | 1.3 | 18.0 | 0.05 | 87 |
| Electroplating Wastes | 3.9 | 18.0 | 0.05 | 74 |
| River water A–275 mg./l., Hardness (CaCO$_3$),[5] 35 p.p.m. turbidity | | 16.4 | [6] 0.1 | [7] 15 |

[1] Contains 3.0%, COOH as acrylic acid.
[2] Contains 5.2%, COOH as acrylic acid.
[3] Contains 19.8%, COOH as acrylic acid.
[4] 25 p.p.m. ferric chloride also added.
[5] 15 mg. Al$_2$(SO$_4$)$_3$ · 18H$_2$O added also.
[6] Mg./l.
[7] Minutes.

EXAMPLE 9

Filtration tests were conducted on suspensions of minus 200 mesh silica (2000 grams silica: 6000 grams water) containing a high percentage of slime material. A vacuum filter leaf, 0.1 square foot in area, was inserted into the pulp for a two minute period. Water was filtered from the pulp at the rate of 210 ml. per minute.

A second filtration test was conducted on a similar suspension of silica after the addition of 0.08 pound per ton of polyacrylamide having an intrinsic viscosity of 5.8 deciliters per gram. The rate of filtration of water was 318 ml. per minute.

A third filtration test was then conducted on the silica suspension using 0.08 pound per ton of polyacrylamide having an intrinsic viscosity of 13 deciliters per gram. The filtration rate was 384 ml. per minute.

A fourth filtration test was run on the silica suspension using 0.08 pound per ton of polyacrylamide having an intrinsic viscosity of 22.0 deciliters per gram. The filtration rate was 540 ml. per minute. In the second test the polyacrylamide was the conventional type material in commercial use. The final two runs show an increase in filtration rates and demonstrate the effect of the polyacrylamides of higher intrinsic viscosities.

EXAMPLE 10

Suspensions of various types of fine solids of 1000 milliliter volume were treated with polyacrylamides of intrinsic viscosities ranging from 12 to 22 deciliters per gram by up-and-down agitation with a perforated disc plunger and allowed to settle. The time of free settling between the 1000- and 600-milliliter graduation marks on the cylinder was noted. In all cases a similar untreated suspension of solids was observed as a control for each of the above tests; in all such control tests incomplete settling with turbid supernatant liquids was observed in marked contrast to rapid flocculation and subsidence of

We claim:
1. The method of clarifying a liquid suspension of solids suspended in an aqueous phase comprising the steps of adding to said suspension a water-soluble polyacrylamide, having an intrinsic viscosity of at least 12 deciliters per gram, and a carboxyl content of not more than about ½% of the polymer units, in an amount sufficient to flocculate and agglomerate said suspended solids, and separating the flocculated and agglomerated solids from the aqueous liquid.

2. The method of clarifying a liquid suspension of solids suspended in an aqueous phase comprising the steps of adding to said suspension a water-soluble polyacrylamide, having an intrinsic viscosity of at least 12 deciliters per gram, and a carboxyl content of not more than about ½% of the polymer units, in an amount sufficient to flocculate and agglomerate said suspended solids, and allowing the solids to settle.

3. The method of clarifying a liquid suspension of solids suspended in an aqueous phase comprising the steps of adding to said suspension a water-soluble polyacrylamide, having an intrinsic viscosity of at least 12 deciliters per gram, and a carboxyl content of not more than about ½% of the polymer units, in an amount of from about 0.001 pound per ton of solids to about 10 pounds per ton of suspended solids, and separating the flocculated and agglomerated solids from the aqueous liquid.

4. The method of clarifying a liquid suspension of solids suspended in an aqueous phase comprising the steps of adding to said suspension a water-soluble polyacrylamide, having an intrinsic viscosity of at least 12 deciliters per gram, and a carboxyl content of not more than about ½% of the polymer units, in an amount of from about 0.001 pound per ton of solids to about 10 pounds per ton of suspended solids, and allowing the solids to settle.

5. The method of settling ore pulps and mineral suspensions containing finely-divided, predominantly non-argillaceous minerals suspended in an aqueous phase and having a pulp density of not more than about 60% solids which comprises treating said ore pulps and mineral suspensions with a water-soluble polyacrylamide having an intrinsic viscosity of at least 12 deciliters per gram, and a carboxyl content of not more than about ½% of polymer units, at a rate of from 0.001 pound per ton of solids to about 10 pounds per ton of solids, and allowing the solids to settle.

6. The method of removing water from ore pulps and mineral suspensions containing finely-divided, predominantly non-argillaceous minerals suspended in an aqueous phase and having a pulp density of not more than about 70% solids which comprises treating said ore pulps and mineral suspensions with a water-soluble polyacrylamide having an intrinsic viscosity of at least 12 deciliters per gram, and a carboxyl content of not more than about ½% of the polymer units, at a rate of from 0.001 pound per ton of solids to about 10 pound per ton of solids, and separating the water from the solids.

7. A process of settling acidic ore pulps and acidic mineral suspensions containing finely-divided minerals produced by the acid leaching of uranium bearing materials which comprises treating said ore pulps and mineral suspensions having a pulp density of not more than about 60% solids with a water-soluble polyacrylamide, having an intrinsic viscosity of at least 12 deciliters per gram, and a carboxyl content of not more than about ½% of the polymer units, at a rate of from 0.001 pound per ton of solids to about 1 pound per ton, and allowing the solids to settle.

8. The method of clarifying a liquid suspension of solids suspended in an aqueous phase comprising the steps of adding to said suspension a water-soluble polyacrylamide, having an intrinsic viscosity of at least 18 deciliters per gram, and a carboxyl content of not more than about ½% of the polymer units, in an amount sufficient to flocculate and agglomerate said suspended solids. and separating the flocculated and agglomerated solids from the aqueous liquid.

9. The method of clarifying a liquid suspension of solids suspended in an aqueous phase comprising the steps of adding to said suspension a water-soluble polyacrylamide, having an intrinsic viscosity of at least 18 deciliters per gram, and a carboxyl content of not more than about ½% of the polymer units, in an amount of from about 0.001 pound per ton of solids to about 10 pounds per ton of suspended solids, and allowing the solids to settle.

10. A process of settling acidic ore pulps and acidic mineral suspensions containing finely-divided minerals produced by the acid leaching of uranium bearing material which comprises treating said ore pulps and mineral suspensions having a pulp density of not more than about 60% solids with a water-soluble polyacrylamide having an intrinsic viscosity of at least 18 deciliters per gram, and a carboxyl content of not more than about ½% of the polymer units, at a rate of from 0.001 pound per ton of solids to about 1 pound per ton of solids, and allowing the solids to settle.

References Cited

UNITED STATES PATENTS 3,418,237   12/1968   Booth et al. _____ 210—54

FOREIGN PATENTS 200,883   2/1956   Australia.

MICHAEL E. ROGERS, Primary Examiner

U.S. Cl. X.R.

260—89.7